United States Patent
Takeuchi et al.

(10) Patent No.: US 6,254,912 B1
(45) Date of Patent: Jul. 3, 2001

(54) METHOD FOR NON-FRY COOKING AND ITS USES

(75) Inventors: Yasuo Takeuchi; Takashi Shibuya; Toshio Miyake, all of Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 0 days.

(21) Appl. No.: 09/292,950

(22) Filed: Apr. 16, 1999

(30) Foreign Application Priority Data

| Apr. 22, 1998 | (JP) | 10-126654 |
| Jun. 5, 1998 | (JP) | 10-172088 |
| Nov. 13, 1998 | (JP) | 10-324279 |

(51) Int. Cl.$^7$ ............... A23L 1/31; A23L 1/317
(52) U.S. Cl. .......... 426/443; 426/639; 426/652; 426/610; 426/465; 426/520; 426/640
(58) Field of Search .............. 426/92, 639, 423, 426/442, 652, 610, 443, 465, 520, 640

(56) References Cited

U.S. PATENT DOCUMENTS

| 5,026,566 | * | 6/1991 | Roser | 426/443 |
| 5,543,513 | * | 8/1996 | Mandai et al. | 536/123.13 |
| 5,892,026 | * | 4/1999 | Okada et al. | 536/136 |

FOREIGN PATENT DOCUMENTS

| 0628630 | 12/1994 | (EP) . |
| 0636693 | 2/1995 | (EP) . |
| 0 739 986 | 10/1996 | (EP) . |
| 0 813 820 | 12/1997 | (EP) . |
| 0 834 516 | 4/1998 | (EP) . |
| 0 867 187 | 9/1998 | (EP) . |
| 0 882 408 | 12/1998 | (EP) . |
| 58-216695 | 12/1983 | (JP) . |
| 62-244 | 1/1987 | (JP) . |
| 63-258543 | 10/1988 | (JP) . |
| 7-111863 | 5/1995 | (JP) . |
| 7-170977 | 7/1995 | (JP) . |
| 7-213283 | 8/1995 | (JP) . |
| 7-246097 | 9/1995 | (JP) . |
| 8-131139 | 5/1996 | (JP) . |
| 8173065 | * | 9/1996 | (JP) . |

OTHER PUBLICATIONS

Scher, M., Biotech food—and no controversy: trehalose to find more food functions as cost falls. Food Processing., v54, n4, p95(2), Apr. 1993.*
Patent Abstracts of Japan, Publication No. 09163943, Publication Date Jun. 24, 1997.
Patent Abstracts of Japan, Publication No. 10014536, Publication Date Jan. 20, 1998.
Patent Abstracts of Japan, Publication No. 08242784, Publication Date Sep. 24, 1996.
Patent Abstracts of Japan, Publication No. 081730065, Publication Date Jul. 9, 1996.
Patent Abstracts of Japan, Publication No. 07147916, Publication Date Jun. 13, 1995.
Patent Abstracts of Japan, Publication No. 07031389, Publication Date Feb. 3, 1995.

* cited by examiner

*Primary Examiner*—Milton Cano
*Assistant Examiner*—Philip DuBois
(74) *Attorney, Agent, or Firm*—Browdy and Neimark

(57) ABSTRACT

A method for non-fry cooking, comprising a step of heating and dehydrating a food material using an aqueous trehalose solution with a relatively-high temperature and concentration; a non-fried food product having a satisfactory mouth feel, flavor, taste and being substantially free of an excessive intake of lipids; and an agent for non-fry cooking comprising trehalose as an effective ingredient.

12 Claims, No Drawings

METHOD FOR NON-FRY COOKING AND ITS USES

BACKGROUND OF THE INVENTION

1. Field of the Invention

The present invention relates to a method for non-fry cooking and its uses, and more particularly to a method for non-fry cooking which comprises a step of heating and dehydrating a food material using an aqueous trehalose solution with a relatively-high temperature and concentration, a non-fried food product obtained by the method, and an agent for non-fry cooking comprising trehalose as an effective ingredient.

2. Description of the Prior Art

Frying is a method for cooking using lipids and is daily used like other cooking such as boiling, steaming, and grilling. A cooking like frying is a method to contact/heat food materials with lipids, heated to a relatively-high temperature, to change the food materials from raw conditions to boiled conditions within a relatively-short period of time. More particularly, frying is a cooking for gelatinizing amylaceous substances and denaturing proteins in food materials. In this case, the water in the food materials is contacted with lipids, heated to a relatively-high temperature, and changed into vapor to lose water in whole or in part, resulting in an obtention non-dried foods which have been dehydrated and concentrated, and which the moisture have been replaced with a relatively-large amount of lipids.

In general, fried foods have an enriched taste and can be eaten directly; they can be suitably used as fast foods. The fried foods, however, have the following demerits: Lipids contained in the fried foods are very susceptible to deterioration and change in quality, and this shortens the shelf-life; they contain a relatively-large amount of lipids that may cause in living bodies a nutritional unbalance and an excessive calorie intake when taken excessively; and peroxidized lipids, that are pointed out on their problematic toxicity, are inevitably taken. Now, it is even said that the excessive intake of fried food products may induce life-style related diseases or geriatric diseases.

As a method to improve the above drawbacks, there used a process for non-fried noodles, comprising heating noodles by steaming and drying them.

Conventional non-fried noodles consist of gelatinized amylaceous substances; they cannot be adequately eaten directly and usually should be further processed by cooking and/or seasoning.

Recently, there have been proposed methods for producing dehydrated food products using sugar alcohols of reducing starch hydrolyzates, for example, in Japanese Patent Kokai Nos. 244/87, 258,543/88, 111,863/95, and 131,139/96.

However, the dehydrated food products prepared with the above sugar alcohols were revealed that they usually tend to become hard as if they were coated with hard candies, they easily become sticky by absorbing moisture during storage, they have a characteristic stimulus taste of sugar alcohols, and they are not easily assimilated and absorbed by living bodies to cause diarrhea.

SUMMARY OF THE INVENTION

The present invention was made to solve the above conventional drawbacks: The first object of the present invention is to establish a novel method for non-fry cooking, the second object is to provide a non-fried food product prepared by the method, and the third object of the present invention is to provide an agent for non-fry cooking.

To solve the above objects, the present inventors continuously studied on the use of saccharide solutions. As a result, they found that aqueous trehalose solutions with a relatively-high concentration have a relatively-high heat tolerance, an adequate free-flowing ability under specific conditions, and a middle level of specific heat suitably used as a heating medium. They also confirmed that non-fried food products with a satisfactory flavor and taste are obtained by heating and dehydrating food materials using aqueous trehalose solutions with a relatively-high temperature and concentration. Thus, the present inventors accomplished this invention.

The present inventors solves the first object by providing a method for non-fry cooking which comprises a step of heating and dehydrating food materials using aqueous trehalose solutions with a relatively-high temperature and concentration; solves the second object by providing a non-fried food product by using the above method; and solves the third object by providing an agent for non-fry cooking, comprising trehalose as an effective ingredient.

DETAILED DESCRIPTION OF THE INVENTION

The trehalose, alias. $\alpha,\alpha$-trehalose, usable in the present invention includes any types of trehaloses as long as their aqueous solutions with a relatively-high temperature and concentration can be used as heating media for the present non-fry cooking, independently of their origins and properties. Trehaloses from different origins, for example, one from yeasts as disclosed in Japanese Patent Kokai No. 246,097/95, one from maltose by the method using phosphorylases as disclosed in Japanese Patent Kokai No. 216, 695/83, and those from starches by the saccharification method using enzymes as disclosed in Japanese Patent Kokai Nos. 170,977/95 and 213,283/95 can be arbitrarily used. Commercially available high-purity crystalline trehalose hydrate and high-purity crystalline trehalose anhydride can be appropriately used. For example, "TREHAOSE®", a high-purity crystalline trehalose hydrate commercialized by Hayashibara Shoji, Inc., Okayama, Japan, can be used arbitrarily. Any temperature and concentration can be applied for the aqueous trehalose solutions used in the present non-fry cooking as long as they easily boil and dehydrate raw food materials into non-fried food products with a satisfactory flavor and taste; usually, preferable temperatures are those which easily gelatinize the amylaceous substances contained in food materials and/or denature proteins and inactivate enzymes present in the food materials, and preferably temperatures of at least 70° C., and more preferably temperatures of at least 80° C. The concentrations of the aqueous trehalose solutions are those which easily vaporize and/or release the moisture in the food materials to dehydrate them, i.e., the highest possible concentrations, preferably at least 50 w/w % (hereinafter "w/w %" is abbreviated as "%", unless specified otherwise), and more preferably at least 60%. To accelerate the heating and dehydrating, aqueous trehalose solutions with a relatively-high temperature and concentration, preferably those with temperatures of at least 80° C. and concentrations of at least 70%, and more preferably temperatures of at least 90° C. and concentrations of at least 75%, can be arbitrarily boiled under a reduced or normal atmospheric pressure to accelerate the vaporization and concentration.

It was revealed that, when continuously boiled to about 115° C. under normal atmospheric pressure, aqueous trehalose solutions having a relatively-high concentration or containing substantially only trehalose as a solute, i.e., those containing at least 70% trehalose as a starting concentration are crystallized and solidified to promptly lose the free-flowing ability far from being used as heating media at over the temperature. In this case, it was found that the coexistence of trehalose and another solutes, that inhibit the crystallization of trehalose, maintains the free-flowing ability of the trehalose solutions even at a relatively-high temperature; One or more solutes selected from the group consisting of saccharides excluding trehalose, sugar alcohols, and glycerine can be arbitrarily used in the present invention to prevent from the loss of free-flowing ability at temperatures of 115° C. or more under normal atmospheric pressure by coexisting the solutes in the aqueous trehalose solutions, preferably coexisting the solutes at concentrations of at least 0.5% but less than 40% with respect to trehalose, on a dry solid basis (d.s.b.).

The saccharides other than trehalose include, for example, glucose, fructose, maltose, isomaltose, maltotriose, lactose, sucrose, etc. It was revealed that, although these saccharides generally have a relatively-low heat tolerance and are susceptible to browning when heated, they have an activity of keeping the free-flowing ability of aqueous trehalose solutions with a relatively-high concentration even at temperatures of 115° C. or higher when coexisted in a relatively-small amount, preferably, at least 0.5% with respect to trehalose, d.s.b.; they have a relatively-low level of browning and are sufficiently used in the present method for non-fry cooking; and they can be arbitrarily used for the non-fry cooking at temperatures of about 120° C. to about 140° C.

The higher the proportion of another saccharides excluding trehalose to the trehalose, the more non-fried food products are susceptible to browning as a drawback of the another saccharides, and the more losing the characteristic crystallization ability and non-hygroscopicity of trehalose. Thus, the proportion should be less than 40%, and more preferably less than 30%.

The sugar alcohols arbitrarily used in the present invention include, for example, erythritol, xylitol, sorbitol, maltitol, lactitol, reducing starch hydrolyzates, etc. It was found that the sugar alcohols can be used in the present non-fry cooking because they have an action of maintaining the free-flowing ability of aqueous trehalose solutions with a relatively-high concentration at temperatures of 115° C. or higher when coexisted in proportions of at least 0.5% to trehalose, d.s.b., and have a lesser fear of inducing browning. More preferably, the sugar alcohols can be arbitrarily used in non-fry cooking at temperatures of 120–180° C. The higher the proportion of sugar alcohols to trehalose, the more susceptible non-fried food products to browning as a drawback of the sugar alcohols, and the more losing the characteristic crystallization ability and non-hygroscopicity of trehalose. Thus, the proportion should be less than 40%, and more preferably less than 30%.

In was found that the coexistence of glycerine in an amount of at least 0.5% to trehalose, d.s.b., keeps the free-flowing ability of aqueous trehalose solutions with a relatively-high concentration even at temperatures of 115° C. or higher, and can be freely used in the present non-fry cooking without fear of inducing browning. More preferably, glycerine can be arbitrarily used in the present non-fry cooking at temperatures of 120–180° C. However, the higher the proportion of glycerine to trehalose, the more susceptible to showing the hygroscopicity as a characteristic drawback of glycerine, and the more susceptible to losing the characteristic crystallization ability and non-hygroscopicity of trehalose. Thus, the proportion should be less than 40%, preferably less than 20%, and more preferably less than 10%.

As described above, the present agent for non-fry cooking used in the non-fry cooking includes aqueous trehalose solutions consisting of trehalose as a solute and having a relatively-high trehalose concentration, or those comprising trehalose and another solutes excluding trehalose in an amount of at least 0.5% but less than 40% with respect to trehalose, d.s.b. These aqueous trehalose solutions have fears of bacterial contamination and of easy crystallization of trehalose found as the reduction of temperature; Generally, the present agent for non-fry cooking in the form of a solid such as crystal, powder or granule can be preferably used as one for non-fry cooking with easier handleability and lesser fear of quality deterioration. In use, such a solid agent is dissolved by heating in water into an aqueous trehalose solution with a relatively-high temperature and concentration.

The representative examples of the method for non-fry cooking according to the present invention are described below in more detail:

The first method according to the present invention is one, which uses an aqueous trehalose solution consisting essentially of trehalose as a solute and having the highest possible trehalose concentration, comprising the steps of providing as a heating medium an aqueous trehalose solution with a relatively-high temperature of at least 70° C., preferably at least 80° C., and more preferably at least 90° C., and with a relatively-high trehalose concentration of at least 50%, preferably at least 60%, and more preferably at least 70%; soaking a food material in the aqueous trehalose solution in an amount of about 1% to about 50%, and preferably about 2% to about 20%; and heating and boiling the mixture under a reduced or normal atmospheric pressure and at a relatively-low temperature at which the aqueous trehalose solution keeps the free-flowing ability. In this method, the aqueous trehalose solution as a heating medium could not generally be increased to about 114° C. under normal atmospheric pressure. Depending on the size of food materials used, a relatively-long period of time is needed to dehydrate the food material by heating; 0.1–2 hours in general. To shorten the time, the starches and proteins contained in the food materials can be either denatured previously or not denatured but soaked in an aqueous trehalose solution with a relatively-high trehalose concentration to replace or dehydrate water in the food materials.

The second method used in the present invention is one for non-fry cooking, which uses an aqueous trehalose solution containing trehalose as a solute as much as possible and another solutes in an amount of at least 0.5% but lower than 40% to trehalose, d.s.b., comprising the steps of providing as a heating medium an aqueous trehalose solution with a relatively-high temperature of at least 70° C., preferably at least 80° C., more preferably at least 90° C., and most preferably at least 115° C., and a trehalose concentration of at least 50%, preferably at least 60%, and more preferably at least 70%; soaking a food material in the aqueous trehalose solution in an amount of, generally, about 1% to about 50%, and preferably about 2% to about 20%; and boiling the trehalose solution under a reduced or normal atmospheric pressure to dehydrate and cook the food material at a higher temperature and a shorter period of time than those used in the above first method. The aqueous trehalose solutions with a relatively-high temperature and concentration as described in the first- and second-methods may become too viscous in some conditions, and this may result in being inferior in the handleability of their cooking. In this case, a small amount of, and preferably less than about 2.0% of oils and fats and/or emulsifiers to the trehalose solutions, d.s.b., can be advantageously added to lower the viscosity of the solutions and to improve the handleability.

In the case of cooking sautés, i.e sautéed dishes, using the aqueous trehalose solutions with a relatively-high trehalose content as described in the above first- and second-methods, they can be preferably cooked by heating using the trehalose solutions with a relatively-low proportion of trehalose to a food material; generally about 5% to about 200%, and preferably about 10% to about 100%.

The non-fried food products thus obtained contain non-crystallized and/or crystallized trehalose present on their surfaces and/or internal textures just after the processings. As the time goes by, the non-crystallized and/or crystallized trehalose absorb moisture to be converted into crystalline trehalose dihydrate and then stabilized. If necessary, the crystallization of crystalline trehalose dihydrate can be promoted by spraying the crystal as a seed over non-fried food products just after their processings. Trehalose, changed to a crystalline trehalose dihydrate form, has a lesser hygroscopicity and an excellent storage stability.

The food materials usable in the present invention include all sorts of materials for which the present non-fry cooking can be applied; fruits such as a lemon, yuzu (a Chinese lemon), sudachi (a kind of citrus fruit), zabon (shaddock), kumquat, banana, pineapple, mango, Chinese gooseberry, strawberry, hawthorn, blueberry, grape, peach, plum, apple, pear, and persimmon; rootcrops such as a carrot, lotus root, onion, edible burdock, radish, taro, *Dioscorea japonica*, *Dioscorea japonica*, sweet potato, and potato; vegetable leaves such as a garden lettuce, wild chicory, cabbage including Chinese cabbage, kale, Jew's marrow, ashitaba (a plant of *Oenanthe javanica*), spinach, komatsu-na (a kind of Chinese cabbage), nozawana (a kind of turnip), garland chrysanthemum, chingensai (a Chinese vegetable), tara-no-me (a bud of Japanese angelica tree), fresh tee leave, and perilla leaf; vegetable fruits such as an okra, cauliflower, broccoli, egg plant, tomato, cucumber, pumpkin, zucchini, sweet pepper, field pea, garden bean, and green soybean; vegetables including mushrooms such as a Japanese mushroom, velvet-stemmed agaric, and oyster mushroom; seeds such as a Job's tear, buckwheat, sesame, rice, barley, corn, mung bean, pea, adzuki bean, broad bean, soybean, peanut, walnut, and Japanese chestnut; meats such as those of cow, horse, sheep, pig, bird, and whale; fishery products such as a tuna, bonito, Japanese Spanish mackerel, cod, olive flounder, sea bream, conger eel, sardine, chub mackerel, horse mackerel, Pacific herring, Pacific saury, salmon, trout, small fish, freshwater clam, short-neck clam, oyster, scallop, top shell, abalone, prawn, shrimp, lobster, crab, mantis shrimp, octopus, and squid; and seaweeds such as an asakusa-nori (a kind of laver), hijiki (a kind of brown algae), wakame seaweed, and tang.

The food materials used in the present invention are generally cut into pieces with an appropriate size and thickness suitable for their heating and dehydrating when cooked, and for eliciting their deliciousness, flavor, and taste.

Of course the food materials can be used in raw conditions, and if necessary they can be treated, for example, with heating to inactivate enzymes contained in the materials, and then soaked in salt solutions for branching or removing harshness, pickled, dried, germinated, or parched for split open to partially process the food materials. For example, completely processed foods such as a steamed rice prepared by cooking rice, a tofu (a bean curd) made from soybean, cheese made from milk, and boiled fish paste made from fish can be arbitrarily cooked by the present method for non-fry cooking.

According to the present method for non-fry cooking, food materials in an appropriate size are generally cooked into foods like fries and fried foods without coating.

In use, the food materials can be arbitrarily cooked by the non-fry cooking into foods like fries or fryings by adhering to the food materials one or more seasonings such as salt, taste-improving agents, sweeteners, acids, and spices, colors, flavors, food preservatives, nutrients such as vitamins and minerals, starches, wheat flours, bakery powders, and polysaccharides.

If necessary, one or more of the above seasonings, flavors, food preservatives, and nutrients can be used by mixing in an appropriate proportion with aqueous trehalose solutions having a relatively-high temperature and concentration as a heating media.

The non-fried food products thus obtained can be further subjected to ventilation drying, heat drying, and vacuum drying to lower the moisture content of below 20%, and preferably below 15%; or packed in a vacuum or inert-gas-injection manner to prolong their shelf-life.

The aqueous trehalose solutions with a relatively-high temperature and concentration used in the present invention have a satisfactory heat-tolerance and safety; During the cooking of food materials by heating and dehydrating, pigments and nutritions such as starches, proteins, and vitamins are not scarcely denatured so that the resulting non-fried food products have a relatively-high product value that they stably keep the nutritions and the color tint of the food materials used.

The present non-fried food products, obtained by heating and dehydrating using aqueous trehalose solutions with a relatively-high temperature and concentration, usually contain crystalline trehalose dihydrate and/or crystalline trehalose anhydride present on their surfaces and/or internal textures, have a relatively-low level of moisture and hygroscopicity, and a satisfactory storage stability as compared with boiled and steamed foods. Unlike conventional fried food products cooked with lipids, the present non-fried food products less deteriorate and change in quality, do not substantially result in an excessive calorie intake due to excessive intake of lipids, and have substantially no fear of toxicity of lipoperoxide.

The present non-fried food products, obtained by heating and dehydrating food materials, preferably by successively heating, boiling, swelling, dehydrating, and concentrating the food materials, contain crystalline trehalose dihydrate and/or crystalline trehalose anhydride on their surfaces and/or internal textures; you can take them into your mouth directly, enjoy their crispy biting property, and taste their enriched flavor and taste imparted after dehydration by heating. The present non-fried food products can be tasted directly as relishes, refreshments, and fast foods, as well as health foods for the prevention and/or treatment for life-style related diseases.

Also the present non-fried food products can be used as materials for confectioneries, bakeries, daily dishes, etc.

The following experiments describe the present invention in more detail:

Experiment 1

Comparison of Aqueous Saccharide Solutions on Heat Stability

The heat stability of aqueous saccharide solutions was evaluated by heating the solutions at a relatively-high temperature and then comparing the coloration degree of the solutions.

The saccharides used were crystalline glucose anhydride, crystalline maltose monohydrate, crystalline sucrose anhydride, crystalline trehalose dihydrate, and crystalline maltitol anhydride in a reagent grade. With these saccharides, aqueous saccharide solutions for testing were respectively prepared by adding 50 mM acetate buffer (pH 4.0) and 50 mM phosphate buffer (pH 7.0) to each saccharide, and dissolving the saccharides by heating into 70 w/w % aqueous solutions, d.s.b. About 60 ml aliquots of the saccharide solutions were placed in 100-ml beakers, and then the beakers were covered with aluminum foil, heated by autoclaving at 120° C. for 30 min, and cooled to 80° C. for observing the coloration degree of the saccharide solutions; The coloration degree of the solutions treated with the heat treatment was macroscopically observed and expressed with the symbols "−", "+", "++", "+++", and "++++", that represent colorless, pale yellow, yellow, yellow brown, and brown, respectively.

The results are in Table 1.

TABLE 1

| Test No. | Saccharide | Coloration (pH 4) | Coloration (pH 7.0) |
|---|---|---|---|
| 1 | Glucose | ++ | ++++ |
| 2 | Maltose | + | +++ |
| 3 | Sucrose | ++ | − |
| 4 | Trehalose | − | − |
| 5 | Maltitol | − | − |

Note :
In the table, the symbol "−" represents that a solution was still colorless, and the symbols "+", "++", "+++", and "++++" represent that the solutions turned to pale yellow, yellow, yellow brown, and brown.

As evident from Table 1, trehalose and maltitol as a sugar alcohol were not colored at both pHs of 4.0 and 7.0, and showed a satisfactory thermal stability. While sucrose was not suitable as a heating medium for non-fry cooking because of its excessive sweetness and poor thermal-stability under the conditions of acid pHs.

Experiment 2
Heat Change of Aqueous High-concentrated Trehalose Solution

Crystalline trehalose dihydrate was prepared into an aqueous trehalose solution by placing the saccharide in a 300-ml beaker, adding water to the contents, and dissolving by heating the saccharide in water into a pH-uncontrolled 50%, 60% or 70% aqueous trehalose solution. Each aqueous solution was placed on a gas heater and heated while measuring the temperature with "MODEL SK-1250MC", a digital thermometer commercialized by Sato Keiryoki Mfg., Co., Ltd., Tokyo, Japan. For the 70% aqueous trehalose solution, it was revealed that the solution began to boiling at about 106° C. and started to crystallizing trehalose at about 115° C. while losing its free-flowing ability and solidifying at the temperature when heated continuously. The data shows the 70% aqueous trehalose solution can be used as a heating medium up to about 115° C. at which the solution retains its free-flowing ability under normal atmospheric pressure. It was revealed as a novel fact that the 50% and 60% aqueous solutions did not unexpectedly solidify even when heated to about 115° C., and retained their free-flowing ability at temperatures exceeding 165° C. The reason is uncertain but it can be estimated that a trehalose crystal, present slightly in the aqueous solutions by some reasons, may induce the crystallization and solidification phenomena.

Experiment 3
Influence of Coexisting Another Solutes on the Free-flowing Ability of Aqueous Trehalose Solution with a Relatively-high Temperature and Concentration In accordance with the method in Experiment 2, crystalline trehalose dihydrate was placed in a 300-ml beaker and prepared into a pH uncontrolled 70% aqueous trehalose solution. To the solution were added another solutes such as crystalline glucose anhydride, crystalline maltose monohydrate, crystalline maltitol anhydride, and glycerine to give respective concentrations of 1.4%, 7.4%, 15.8%, 25.5% and 36.8%, and the solutes were dissolved by heating into aqueous high-concentrated trehalose solutions. Similarly as in Experiment 2, the solutions were placed on a gas heater, heated, boiled while measuring their temperatures, and then further continued heating and boiling while checking the temperature that allowed to lose the free-flowing ability of the solutions and observing the coloration degrees of the solutions just before the phenomenon was observed, or examining the coloration degree by heating to about 200° C. for the solutions that did not lose their free-flowing ability when heated and boiled continuously.

The coloration was studied by macroscopically observing the coloration degree of the solutions according to the method in Experiment 1.

The results are in Table 2.

TABLE 2

| Other saccharide | Coexisting percentage (%), on a dry solid basis | 0 | 1.4 | 7.4 | 15.8 | 25.5 | 36.8 |
|---|---|---|---|---|---|---|---|
| Glucose | Solidified temperature (° C.) | 115 | 130 | 140 | Not solidified | Not solidified | Not solidified |
|  | Coloration | − | − | − | + + | + + | + + + + |
| Maltose | Solidified temperature (° C.) | 115 | 122 | 130 | Not solidified | Not solidified | Not solidified |
|  | Coloration | − | − | − | + | + + | + + + |
| Maltitol | Solidified temperature (° C.) | 115 | 120 | 130 | Not solidified | Not solidified | Not solidified |
|  | Coloration | − | − | − | − | + | + |
| Glycerine | Solidified temperature (° C.) | 115 | 122 | 127 | Not solidified | Not solidified | Not solidified |
|  | Coloration | − | − | − | − | + | + |

TABLE 2-continued

| Other saccharide | Coexisting percentage (%), on a dry solid basis | 0 | 1.4 | 7.4 | 15.8 | 25.5 | 36.8 |
|---|---|---|---|---|---|---|---|

Note: In the table, the symbol "−" represents that a solution was still colorless, and the symbols "+", "+ +", "+ + +", and "+ + + +" represent that the solutions turned to pale yellow, yellow, yellow brown, and brown.

As evident from Table 2, for the aqueous solutions consisting of trehalose as a solute, they lost their free-flowing ability at about 115° C. similarly as the results in Experiment 2; When coexisted another solutes such as glucose, maltose, maltitol, and glycerine, the higher the proportion of such a solute to trehalose, the higher the temperature at which the aqueous solutions lose their free-flowing ability, meaning that it expands the region of high temperatures at which the aqueous solutions still keep their free-flowing ability.

It was also found that the aqueous solutions, in which these solutes were coexisted in an amount of at least 15.8% to trehalose, d.s.b., do not lose their free-flowing ability even when heated to about 200° C., and can be arbitrarily used as a heating medium for the present non-fry cooking.

From a viewpoint of coloration, maltitol and glycerine, as solutes to be coexisted, having no reducing residue are superior to glucose and maltose having reducing residues.

Experiment 4
Influence of the Coexistence of Another Solutes on Aqueous Trehalose Solution with a Relatively-high Temperature and Concentration used in the Test for Non-fry Cooking Apples were pealed and sliced into slices, about 5-mm thick, and then passed through a 0.5% salt solution for a material food used in this experiment.

Twenty parts by weight of water and 80 parts by weight of crystalline trehalose dihydrate were placed in a plain pan, and the saccharide was dissolved in water by heating into an aqueous high-concentrated trehalose solution. When heated to a temperature of 109° C. by the additional heating and boiling, about five parts by weight of the above sliced apples were soaked in the trehalose solution, and then continued boiling under heating conditions and taken out of the solution when the solution was heated to 114° C.

Using aqueous saccharide solutions, prepared by adding to the above aqueous high-concentrated trehalose solution crystalline maltitol anhydride in an amount of 3.6%, 7.4%, 15.8%, 36.8% and 66.3%, d.s.b., heating the mixtures to dissolve the saccharide, and adjusting the solutions to the highest possible temperatures of 115° C., 125° C., 130° C., 140° C. and 150° C., the above sliced apples were soaked in each saccharide solution and continued boiling for non-fry cooking until the temperature of the solutions increased by about 5° C.

During the cooking, the cooking time (min) for each solution was measured, and the moisture content (%) of the non-fried foods was measured after taking them out of the solutions and drying them overnight under a ventilation of air heated to 35° C. Furthermore, the presence of and the sugar coating of crystalline trehalose dihydrate on the surface of the fried sliced apples, and the internal color tint of the slices were observed. The mouth feel, flavor, and taste of the non-fried foods were evaluated. The moisture content was measured by heating samples at about 95° C. using "EB-340MOC", an electric moisture meter commercialized by Shimadzu Corporation, Tokyo, Japan.

The results are in Table 3.

TABLE 3

| | Test No. | 1 | 2 | 3 | 4 | 5 | 6 |
|---|---|---|---|---|---|---|---|
| A | Water (part by weight) | 20 | 20 | 20 | 20 | 20 | 20 |
| | Crystalline trehalose dihydrate (part by weight) | 80 | 80 | 80 | 80 | 80 | 80 |
| | Crystalline maltitol anhydride (part by weight) | 0 | 2.6 | 5.4 | 11.4 | 26.7 | 48.0 |
| | Coexisting percentage, on a dry solid basis | 0 | 3.6 | 7.4 | 15.8 | 36.8 | 66.3 |
| B | Initiation temp. (° C.) | 109 | 115 | 125 | 130 | 140 | 150 |
| | Terminated temp. (° C.) | 114 | 120 | 130 | 135 | 145 | 155 |
| | Time (min) | 15 | 14 | 12 | 11 | 10 | 9 |
| C | Moisture (%) | 9.5 | 9.2 | 7.8 | 6.6 | 6.0 | 4.2 |
| | Crystallization, sugar coating | Found | Found | Found | Found | Found | Not found |
| | Color tint of apples | Pale yellow | Pale yellow | Pale yellow | Yellow | Yellow | Brown |
| | Mouth feel | Soft | Soft | Soft | Soft | Soft | Hard |
| | Flavor and taste | Satisfiable | Satisfiable | Satisfiable | Satisfiable | Satisfiable | Burned taste |

Note: The symbols "A", "B", and "C" represent an aqueous trehalose solution, non-fry cooking, and non-fried food, respectively.

As evident from the results in Table 3, as the proportion of the coexisting solute in the aqueous trehalose solution with a relatively-high concentration is increased, the temperature of the solution can be more increased to shorten the time needed for non-fry cooking. However, the higher the temperature of the solution, the more accelerated the coloration of the resulting non-fried food, and this promotes the color change, quality-change, and deterioration.

In conclusion, it was revealed that the non-fried foods, obtained with the proportion of the coexisting solute in the aqueous trehalose solution with a high concentration of less than 40%, d.s.b., and more preferably less than 36.8%, have an adequate moisture content, crystalline trehalose dihydrate on their surface, satisfactory sugar coating, retain the color tint inherent to the food materials used, have an adequate softness and mouth feel not so hard when eaten, and have an enriched flavor and taste.

The preferred embodiments according to the present invention are the following Examples A and B that describe the agents for non-fry cooking and the non-fried food products according to the present invention:

EXAMPLE A-1
Agent for Non-fry Cooking

A powdery agent for non-fry cooking was prepared by mixing to homogeneity 100 parts by weight of crystalline trehalose dihydrate with five parts by weight of crystalline maltose monohydrate.

An aqueous solution, a relatively-high concentration solution prepared by dissolving the above agent in water under heating conditions, is favorably used as a heating medium for non-fry cooking.

EXAMPLE A-2
Agent for Non-fry Cooking

A powdery agent for non-fry cooking was prepared by mixing to homogeneity 100 parts by weight of "TREHAOSE®", a high-purity crystalline trehalose hydrate commercialized by Hayashibara Shoji, Inc., Okayama, Japan, with 10 parts by weight of crystalline maltitol anhydride.

An aqueous solution, a relatively-high concentration solution prepared by dissolving the agent in water under heating conditions, is favorably used as a heating medium for non-fry cooking.

EXAMPLE A-3
Agent for Non-fry Cooking

A powdery agent for non-fry cooking was prepared by mixing to homogeneity 100 parts by weight of "TREHAOSE®", a high-purity crystalline trehalose hydrate commercialized by Hayashibara Shoji, Inc., Okayama, Japan, with five parts by weight of reducing starch hydrolyzate, and one part by weight of glycerine.

An aqueous solution, a relatively-high concentration solution prepared by dissolving the above agent in water under heating conditions, is favorably used as a heating medium for non-fry cooking.

EXAMPLE A-4
Agent for Non-fry Cooking

A powdery agent for non-fry cooking was prepared by mixing to homogeneity 100 parts by weight of crystalline trehalose dihydrate with five parts by weight of sorbitol, and one part by weight of erythritol.

An aqueous solution, a relatively-high concentration solution prepared by dissolving the product in water under heating conditions, is favorably used as a heating medium for non-fry cooking.

EXAMPLE B-1
Non-fried Banana

Bananas were peeled and cut with a cutter into slices with about 1-cm thick. Four parts by weight of the slices were soaked in a solution, which had been prepared by dissolving in 20 parts by weight of water about 80 parts by weight of an agent for non-fry cooking obtained by the method in Example A-1, and had been boiling at about 115° C. under normal atmospheric pressure, and then boiled continuously for about 15 min to dehydrate and concentrate the slices until the solution was heated to about 125° C. Thereafter, the non-fried slices were placed on a plain sieve, sprayed with a small amount of a high-purity crystalline trehalose hydrate, and allowed to stand overnight at ambient temperature to obtain a non-fried banana coated with crystalline trehalose dihydrate by crystallizing the saccharide thereon. Although the product was rather swelled and deformed as compared with the uncooked material slices of banana, it had a satisfactory mouth feel, flavor and taste, and well retained the color tint of the characteristic internal texture and well stimulated your appetite. The product is a health food free of an excessive lipid intake and can be arbitrarily used as a snack, relish, therapeutic food, and a material for confectioneries, breads, and buns.

EXAMPLE B-2
Non-fried Grane

Grapes, which had been pealed and removed the seeds, were soaked in a 60% aqueous trehalose solution at 70° C. for three hours. Five parts by weight of the grapes taken out the solution were then soaked in a boiling solution at about 110° C. under normal atmospheric pressure, which had been prepared by dissolving under heating conditions 80 parts by weight of "TREHAOSE®", a high-purity crystalline trehalose hydrate commercialized by Hayashibara Shoji, Inc., Okayama, Japan, in 25 parts by weight of water, and continuously heated until the solution was heated to about 114° C. for about 15 min to dehydrate and concentrate the grapes. Thereafter, the resulting product was placed on a sieve, sprayed with a small amount of a high-purity crystalline trehalose hydrate, and ventilated for drying with air heated to 35° C. for six hours to obtain a non-fried grape coated with crystalline trehalose dihydrate by crystallizing the saccharide thereon.

Although the product was rather deformed as compared with the material grape, it had a satisfactory flavor and taste.

The product is a health food free of an excessive intake of lipids, and can be arbitrarily used as a snack, relish, and a material for cakes, chocolates, breads, buns, ice creams, and sherbets.

EXAMPLE B-3
Non-fried Apple

An apple was pealed, cut by a slicer into slices having about 5-mm thick, soaked for two hours in a 60% aqueous trehalose solution heated to 60° C. and containing 0.1% salt. Five parts by weight of the resulting slices taken out of the solution were then soaked in a solution boiling at 110° C. under normal atmospheric pressure, which had been prepared by dissolving by heating 80 parts by weight of "TREHAOSE®", a high-purity crystalline trehalose hydrate commercialized by Hayashibara Shoji, Inc., Okayama, Japan, in 25 parts by weight of water, and continued heating until the solution was heated to about 112° C. for about 10 min to dehydrate and concentrate the slices. Thereafter, the resulting product was placed on a sieve, sprayed with a small amount of a high-purity trehalose crystalline hydrate, and dried by ventilating at 50° C. for six hours to obtain a non-fried apple coated with crystalline trehalose dihydrate by crystallizing the saccharide thereon.

Although the product was rather deformed as compared with the material apple, the product had a satisfactory flavor and taste.

The product is a health food free of an excessive intake of lipids, and can be arbitrarily used as a snack, relish, therapeutic food, and a material for confectioneries, breads, buns, and daily dishes.

EXAMPLE B-4
Non-fried Strawberry

Five parts by weight of strawberries, which had been removed their calyxes, were soaked in a boiling solution at about 90° C. under a reduced pressure, which had been prepared by dissolving by heating 80 parts by weight of "TREHAOSE®", a high-purity crystalline trehalose hydrate commercialized by Hayashibara Shoji, Inc., Okayama, Japan, in 25 parts by weight of water, and continued heating until the solution was heated to about 100° C. for about 20 min to dehydrate and concentrate the strawberries. Thereafter, the resulting product was placed on a sieve and ventilated with air heated to 35° C. for drying overnight to obtain a non-fried strawberry coated with crystalline trehalose dihydrate by crystallizing the saccharide thereon.

Although the product was rather deformed as compared with the material strawberry, it had a satisfactory flavor and taste and well retained the color tint of the internal texture of strawberry as it attracts your appetite. The product is a health food free of an excessive intake of lipids, and can be arbitrarily used as a snack, relish, and a material for cakes, chocolates, confectioneries, breads, buns, ice creams, and sherbets.

EXAMPLE B-5
Non-fried Pumpkin

A pumpkin was cut by a slicer into slices having about 5-mm thick, and five parts by weight of the slices were soaked in a solution boiling at 120° C. under a reduced pressure, which had been prepared by dissolving by heating 80 parts by weight of an agent for non-fry cooking obtained by the method in Example A-2 in 20 parts by weight of water, and continued heating until the solution was heated to about 130° C. for about 15 min to dehydrate and concentrate the slices. Thereafter, the resulting product was placed on a sieve, sprayed with a small amount of a high-purity trehalose hydrate, and dried by ventilating at ambient temperature overnight to obtain a non-fried pumpkin coated with crystalline trehalose dehydrate by crystallizing the saccharide thereon.

Although the product was rather deformed as compared with the material pumpkin, it had a satisfactory flavor and taste and well retained the color tint of the internal texture of pumpkin as it attracts your appetite. The product is a health food free of an excessive intake of lipids, and can be arbitrarily used as a snack, relish, therapeutic food, and a material for confectioneries, breads, buns, and daily dishes.

EXAMPLE B-6
Non-fried Carrot

A carrot was peeled and cut with a cutter into slices with about 5-mm thick. Four parts by weight of the slices were soaked in a solution, which had been prepared by dissolving in 20 parts by weight of water about 80 parts by weight of an agent for non-fry cooking obtained by the method in Example A-3 and had been boiling at about 120° C. under normal atmospheric pressure, and continued boiling for about 15 min to dehydrate and concentrate the slices until the solution was heated to about 130° C. Thereafter, the resulting product was placed on a plain sieve, sprayed with a small amount of a high-purity trehalose hydrate, and allowed to stand at ambient temperature overnight to obtain a non-fried carrot coated with crystalline trehalose dihydrate by crystallizing the saccharide thereon.

Although the product was rather deformed as compared with the material carrot, it had a satisfactory flavor and taste and well retained the color tint of the internal texture of carrot as it attracts your appetite. The product is a health food free of an excessive intake of lipids, and can be arbitrarily used as a snack, relish, therapeutic food, and a material for confectioneries, breads, buns, and daily dishes.

EXAMPLE B-7
Non-fried Fresh Leaf of Green Tea

Five parts by weight of fresh leaves of green tea were soaked in a solution, which had been prepared by dissolving in 25 parts by weight of water about 80 parts by weight of "TREHAOSE®", a high-purity crystalline trehalose hydrate commercialized by Hayashibara Shoji, Inc., Okayama, Japan, and had been boiling at about 106° C. under normal atmospheric pressure, and continued boiling for about 20 min to dehydrate and concentrate the leaves until the solution was heated to about 112° C. Thereafter, the fried leaves were placed on a plain sieve and allowed to stand at ambient temperature overnight to obtain a non-fried fresh tea leaf coated with crystalline trehalose dihydrate by crystallizing the saccharide thereon.

Although the product was rather deformed as compared with the material fresh tea leaf, it had a satisfactory flavor and taste and well retained the color tint of the internal texture of the leaf as it attracts your appetite. The product is a health food free of an excessive intake of lipids, and can be arbitrarily used as a snack, relish, therapeutic food, and a material for confectioneries, breads, buns, and daily dishes.

EXAMPLE B-8
Non-fried Aduzki-bean

Adzuki beans were boiled in the usual manner, and five parts by weight of the boiled adzuki beans were soaked in a solution, which had been prepared by dissolving in 20 parts by weight of water and 180 parts by weight of an agent for non-fry cooking obtained by the method in Example A-1, and had been boiling at about 115° C. under normal atmospheric pressure, and continued boiling for about 15 min to dehydrate and concentrate the beans until the solution was heated to about 125° C. Thereafter, the fried beans were placed on a plain sieve, sprayed with a small amount of a high-purity trehalose hydrate, and allowed to stand at ambient temperature overnight to obtain a non-fried fresh adzuki bean coated with crystalline trehalose dihydrate by crystallizing the saccharide thereon.

Although the product was rather swelled and deformed as compared with the material adzuki bean, it had a satisfactory flavor and taste and well retained the color tint of the internal texture of the bean as it attracts your appetite.

The product is a health food free of an excessive intake of lipids, and can be arbitrarily used as a snack, relish, therapeutic food, and a material for confectioneries, breads, buns, and daily dishes.

EXAMPLE B-9
Non-fried Soybean

Soybeans were washed with water and soaked in 4-time volumes of water for six hours, and then boiled and placed on a sieve to obtain boiled beans. The beans were soaked in a 60% aqueous trehalose solution containing 0.1% magnesium chloride at 70° C. for three hours, and taken out of the solution. Five parts by weight of the resulting beans were soaked in a solution, which had been prepared by dissolving in 35 parts by weight of water about 80 parts by weight of "TREHAOSE®", a high-purity crystalline trehalose hydrate commercialized by Hayashibara Shoji, Inc., Okayama, Japan, and had been boiling at about 115° C. under normal atmospheric pressure, and continued boiling for about 10 min to dehydrate and concentrate the soybeans until the solution was heated to about 118° C. Thereafter, the fried beans were placed on a plain sieve, sprayed with a small amount of a high-purity trehalose hydrate, and ventilated for five hours with air heated to 35° C. to obtain a non-fried fresh tea leaf coated with crystalline trehalose dihydrate by crystallizing the saccharide thereon.

Although the product was rather deformed as compared with the material soybeans, it had a satisfactory flavor and taste.

The product is a health food free of an excessive intake of lipids, and can be arbitrarily used as a snack, relish, therapeutic food, and a material for confectioneries, breads, buns, and noodles.

EXAMPLE B-10
Non-fried Japanese Chestnut

Japanese chestnuts, which had been pealed their astringent skins, were soaked in a 50% aqueous trehalose solution containing 0.1% citric acid at 60° C. overnight, and then taken out of the solution, soaked in a solution, which had been prepared by dissolving in 25 parts by weight of water 0.08 part by weight of citric acid, 80 parts by weight of "TREHAOSE®", a high-purity crystalline trehalose hydrate commercialized by Hayashibara Shoji, Inc., Okayama, Japan, and had been boiling at about 106° C. under normal atmospheric pressure, and continued boiling for about 20 min to dehydrate and concentrate the Japanese chestnuts until the solution was heated to about 112° C. Thereafter, the fried Japanese chestnuts were placed on a plain sieve and ventilated with air heated to 35° C. overnight for drying to obtain a non-fried fresh Japanese chestnut coated with crystalline trehalose dihydrate by crystallizing the saccharide thereon.

The product substantially retained the original shape, had a satisfactory mouth feel, flavor and taste, and well retained the color tint of the internal texture of the Japanese chestnut as it attracts your appetite. The product is a health food and can be arbitrarily used as a snack, relish, therapeutic food, and a material for confectioneries, breads, buns, and daily dishes.

EXAMPLE B-11
Non-fried Rice

Cleaned rices were washed with water, soaked in 3-time volumes of a 5% aqueous trehalose solution containing 0.1% calcium lactate at ambient temperature for 10 hours, and then taken out of the solution, steamed with a steamer for 30 min to obtain steamed rices. Six parts by weight of the steamed rices were soaked in a solution, which had been prepared by dissolving in 30 parts by weight of water 80 parts by weight of "TREHAOSE®", a high-purity crystalline trehalose hydrate commercialized by Hayashibara Shoji, Inc., Okayama, Japan, and had been boiling at about 110° C. under normal atmospheric pressure, and continued boiling for about five minutes to dehydrate and concentrate the rices until the solution was heated to about 112° C. Thereafter, the resultant product was placed on a plain sieve, sprayed with s small amount of a high-purity trehalose hydrate, and ventilated for five hours with air heated to 50° C. for drying to obtain a non-fried rice coated with crystalline trehalose dihydrate by crystallizing the saccharide thereon.

Although the product was rather swelled and deformed as compared with the material steamed rices, it had a satisfactory flavor and taste.

The product is a health food free of an excessive intake of lipids, and can be arbitrarily used as a snack, relish, therapeutic food, and a material for confectioneries, breads, buns, and daily dishes.

EXAMPLE B-12
Non-fried Tofu

A tofu was cut into 1-cm square cubes and sprayed with adequate amounts of a seasoned salt and a powdered Guinea pepper, Five parts by weight of the resultant cubes were soaked in a solution, which had been prepared by dissolving under heating conditions in 20 parts by weight of water 80 parts by weight of an agent for non-fry cooking, obtained by the method in Example A-4, and had been boiling at about 115° C. under normal atmospheric pressure, and continued boiling for about 20 min to dehydrate and concentrate the contents until the solution was heated to about 125° C. Thereafter, the fried tofu cubes were placed on a plain sieve, sprayed with a small amount of a high-purity crystalline trehalose hydrate, and ventilated with air heated to 35° C. overnight for drying to obtain a non-fried tofu coated with crystalline trehalose dihydrate by crystallizing the saccharide thereon.

The product was rather swelled and deformed as compared with the original shape of tofu cubes; it had a satisfactory mouth feel, flavor and taste, and well retained the color tint of the internal texture of tofu as it attracts your appetite. The product is a health food substantially free of an excessive intake of lipids, and can be arbitrarily used as a snack, relish, therapeutic food, and a material for confectioneries, breads, buns, and daily dishes.

EXAMPLE B-13
Non-fried White Meat

White meat was steamed, made into pieces with an about 1-cm thick, and soaked in a seasoning solution. Five parts by weight of seasoned white meat was soaked in a solution heated to about 130° C., which had been prepared by dissolving under heating conditions in 20 parts by weight of water 80 parts by weight of an agent for non-fry cooking obtained by the method in Example A-2, and had been boiling at normal atmospheric pressure, and continued boiling until the solution was heated to about 140° C. for about 20 min to dehydrate and concentrate the contents. Thereafter, the resulting product was placed on a plain sieve, sprayed with a small amount of a high-purity crystalline trehalose hydrate, and ventilated with air heated to 35° C. overnight for drying to obtain a non-fried white meat coated with crystalline trehalose dihydrate by crystallizing the saccharide thereon.

The product was rather swelled and deformed as compared with the material white meat; it had a satisfactory mouth feel, flavor and taste, and well retained the color tint of the internal texture of white meat as it attracts your appetite. The product is a health food substantially free of an excessive intake of lipids, and can be arbitrarily used as a snack, relish, therapeutic food, and a material for confectioneries, breads, buns, and daily dishes.

EXAMPLE B-14
Non-fried Salmon

Salmon blocks, which had been seasoned slightly with salt, were cut by a slicer into slices, about 2-cm thick, and then soaked in a solution, which had been prepared by dissolving under heating conditions in 20 parts by weight of water 80 parts by weight of an agent for non-fry cooking, obtained by the method in Example A-3, and had been boiling at about 120° C. under normal atmospheric pressure, and continued boiling for about 20 min to dehydrate and concentrate the contents until the solution was heated to about 130° C. Thereafter, the fried slices were placed on a plain sieve, sprayed with a small amount of a high-purity crystalline trehalose hydrate, and ventilated with air heated to 35° C. overnight for drying to obtain a non-fried fresh sermon coated with crystalline trehalose dihydrate by crystallizing the saccharide thereon.

The product was rather swelled and deformed as compared with the material sliced salmon; it had a satisfactory mouth feel, flavor, and taste, and well retained the color tint of the internal texture of the sliced sermon as it attracts your appetite. The product is a health food substantially free of an excessive intake of lipids, and can be arbitrarily used as a snack, relish, therapeutic food, and a material for confectioneries, breads, buns, and daily dishes.

EXAMPLE B-15

Non-fried Shrimp

Pre-stripped shrimps were sprayed with a powdery curry roux, and five parts by weight of which were soaked in a solution, which had been prepared by dissolving under heating conditions in 20 parts by weight of water 80 parts by weight of an agent for non-fry cooking obtained by the method in Example A-4, and had been boiling at about 115° C. under normal atmospheric pressure, and continued boiling for about 20 min to dehydrate and concentrate the contents until the solution was heated to about 125° C. Thereafter, the fried shrimps were placed on a plain sieve, sprayed with a small amount of high-purity crystalline trehalose hydrate, and ventilated with air heated to 35° C. overnight for drying to obtain a non-fried shrimp coated with crystalline trehalose dihydrate by crystallizing the saccharide thereon.

The product was rather swelled and deformed as compared with the material shrimp; it had a satisfactory mouth feel, flavor and taste, and well retained the color tint of the internal texture of the shrimp as it attracts your appetite. The product is a health food substantially free of an excessive intake of lipids, and can be arbitrarily used as a snack, relish, therapeutic food, and a material for confectioneries, breads, buns, and daily dishes.

EXAMPLE B-16

Non-fried Small Fish One hundred parts by weight of small horse mackerels were soaked in a solution, which had been prepared by dissolving under heating conditions in 100 parts by weight of water 100 parts by weight of "TREHAOSE®", a high-purity crystalline trehalose hydrate commercialized by Hayashibara Shoji, Inc., Okayama, Japan, five parts by weight of salt, 46 parts by weight of "HS-500", a hydrogenated starch syrup commercialized by Hayashibara Shoji, Inc., Okayama, Japan, and had been boiling at about 160° C. under normal atmospheric pressure, and continued boiling for about 15 min to dehydrate and concentrate the fishes until the solution was heated to about 170° C. Thereafter, the fried fishes were placed on a plain sieve and cooled by ventilation to obtain a glossy non-fried fish coated with non-crystallized trehalose and hydrogenated starch syrup on its surface.

The product had a satisfactory mouth feel, flavor and taste. It is a health food substantially free of an excessive intake of lipids, and can be arbitrarily used as a snack, sort of delicacy, relish, therapeutic food, and a material for confectioneries, breads, buns, and daily dishes.

As described above, the present invention provides a method for non-fry cooking, a non-fried food product prepared by the method, and an agent for non-fry cooking comprising trehalose as an effective ingredient.

Cooking without using lipids, the present non-fried food products less deteriorate and change in quality, and substantially have no fear of an excessive intake of lipids. The present food products are cooked without deteriorating nutritive ingredients and the color tint of the material foods used, and are superior in shelf-life because of its relatively-low moisture content. The present food products, coated with crystalline trehalose dihydrate by crystallizing the saccharide thereon, can be used as health foods having a satisfactory mouth feel, crispy biting property, and condensed flavor and taste.

Thus, the establishment of the present invention explores a novel health food and will influence on a variety of fields; the industrial significance of the present invention in the fields of seasonings including sweeteners, snack foods, relishes, confectioneries, daily dishes, health foods for preventing and/or treating life-style related diseases, etc., is unfathomable.

While there has been described what is at present considered to be the preferred embodiments of the invention, it will be understood the various modifications may be made therein, and it is intended to cover in the appended claims all such modifications as fall within the true spirits and scope of the invention.

We claim:

1. A method for non-fry cooking, comprising heating and dehydrating a food material in an aqueous trehalose solution at a temperature of at least 70° C. and with a trehalose concentration of at least 50 w/w %.

2. The method according to claim 1, wherein said aqueous trehalose solution further contains another solute in an amount of less than 40 w/w % with respect to trehalose, on a dry solid basis, said other solutes being selected from edible solutes which have a low heat tolerance and are subject to browning at temperatures above 115° C.

3. The method according to claim 2, wherein said another solute is one or more members selected from the group consisting of sugar alcohols, glycerine, and saccharides excluding trehalose.

4. The method according to claim 1, wherein the heating and dehydrating step comprises a step of boiling said food material under normal atmospheric pressure or a reduced pressure.

5. A method for non-fry cooking, comprising heating and dehydrating a food material in an aqueous trehalose solution at a temperature of at least 70° C. and with a trehalose concentration of at least 50 w/w %, which further comprises drying and/or ageing said food material being dried by heating to crystallize and incorporate into said food material crystalline trehalose dihydrate and/or crystalline trehalose anhydride.

6. A method for cooking a solid food product without frying and without addition of lipids, and simultaneously dehydrating said solid food product so as to obtain a cooked food product simulating a fried food product in taste and mouth-feel, comprising providing a concentrated aqueous trehalose solution having a trehalose concentration of at least 50%, placing said solid food product in said concentrated aqueous trehalose solution, and cooking said solid food product in said concentrated aqueous trehalose solution at a temperature of at least 70° C. until said food product has become cooked and crispy.

7. The method of claim 6, comprising pre-soaking said solid food product in said concentrated aqueous trehalose solution for a time sufficient to partially pre-dehydrate said solid food product prior to heating said concentrated aqueous trehalose solution to at least 70° C.

8. The method of claim 6, wherein said concentration of trehalose in said concentrated aqueous solution is at least 60% and said cooking temperature is at least 80° C.

9. The method of claim 6, wherein said concentration of trehalose in said concentrated aqueous solution is at least 70% and said cooking temperature is at least 90° C.

10. The method of claim 6, wherein said cooking comprises boiling said concentrated aqueous trehalose solution.

11. The method of claim 6, wherein said solid food product is a fruit, a vegetable or animal flesh, and wherein the quantity of said solid food product is about 1% to about 50% based on said concentrated aqueous trehalose solution.

12. The method of claim 11, the quantity of said solid food product is about 2% to about 20% based on said concentrated aqueous trehalose solution.

* * * * *